Patented Nov. 4, 1952

2,616,806

UNITED STATES PATENT OFFICE 2,616,806

PROCESS FOR THE MANUFACTURE OF COLORED PHOTOGRAPHIC IMAGES

Béla Gaspar, Beverly Hills, and Paul Daniel Dreyfuss, Van Nuys, Calif., assignors, by mesne assignments, to said Gaspar No Drawing. Application March 4, 1949, Serial No. 79,737

10 Claims. (Cl. 95—88)

This invention relates to the production of dye images from photographic silver images by a process which comprises the synthesis of an azo dye in the exposed photographic emulsion layer.

In the United States Letters Patent 2,071,688, dated February 23, 1937, is described and claimed a method of producing color photographic images in which the photographic layer is subject to two treatments, the first treatment consisting of the conversion of a dye forming substance into a dye and the second treatment consisting of the local dye destruction at the required points. Thus, for example, a diazo compound is transformed into an azo dye by coupling with a phenol; or a phenol or other azo coupler is transformed into an azo dye by treatment with a diazo compound, the azo dyes thus formed then being destroyed locally.

In the same patent is described a method whereby durable diazo compounds or other durable products of conversion of the diazo compounds, such as diazo-amino compounds, triazenes or nitrosamines may be added to the layer itself, with or without coupling components. It is obvious that these durable compounds, if incorporated in the photographic layers, have advantages over the free diazonium salts. The free diazonium salts would deteriorate, they would couple prematurely and they might spoil the latent silver image.

The object of this invention is a process using said durable diazo compounds or other durable products of conversion of the diazo compounds in photographic processing baths. These compounds, if used in the processing baths, have advantages over the free diazonium compounds which were not known heretofore.

The compounds, used in the photographic baths according to the present invention, are derivatives of diazo compounds which are not capable of coupling with azo coupling compounds but which are convertible by simple operations into diazo compounds which are then capable of coupling. These derivatives of diazo compounds are those which have been referred to as passive stabilized diazo compounds (see K. H. Saunders' The Aromatic Diazo Compounds and Their Technical Applications, London, E. Arnold Company, 1936, page 30). Most of them, such as antidiazotates, triazenes, diazosulfones, etc., adhere to the general formula $Ar(-N=N-A)_n$ which is derived from a diazotizable amine $Ar(NH_2)_n$ and in which A is a residue other than an anion and $n$ is an integer; others (such as nitrosamines and nitrosoarylamides) have the constitution

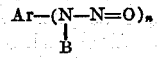

where B stands for hydrogen or for a substituent such as an acyl residue. All of these compounds are readily converted into reactive diazo compounds capable of coupling such as, diazonium salts $Ar(-N=N-X)_n$ where X is an anion, or syn-diazotates $Ar(-N=N-OK)_n$ where K is a cation.

The term "passive stabilized diazo compounds" as used herein designates diazo compounds so treated or so combined that they can be preserved in the solid state for an appreciable period measurable at least by weeks at ordinary temperature, in which the explosive properties have been annulled and which upon addition of water will afford a solution which will only display the coupling power of the original diazo compound after it is liberated by a suitable treatment. The "passive stabilized diazo compounds" are therefore distinguished from "active stabilized diazo compounds" in that the latter display coupling power immediately upon solution in water.

Photographic baths containing antidiazotates are known to be used in the conversion of silver halide images into silver antidiazotate images. The fixation of an antidiazotate in the form of an image is not the object of the present invention.

It was found that diazotates $Ar(-N=NOK)_n$ have a superior penetrating capacity for photographic layers as compared with the diazonium salts. This is particularly the case, if sulfonated diazo compounds are used and if the binding agent used in the layers is gelatin. In those instances in which the gelatin layers contain basic precipitating agents the advantage of the processing baths containing diazotates over those containing diazonium salts is particularly conspicuous. In a multilayer material, the penetration of an acid diazo solution into the bottom layer may be difficult or may take a very long time, whereas the penetration of the corresponding diazotate may be easily effected in a few minutes.

The same effect is observed when the diazonium salt bath is replaced with a bath containing another of the above mentioned diazo derivatives. In the compounds $Ar-(N=N-A)_n$ and

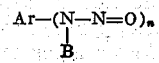

the substituents A and B permit wide variations. These substituents may contain groups which facilitate the penetration of the diazo component into the layer. Diazo components which are combined with such amines as Piperidinesulfonic acid,
Sarkosine,
Methyltaurine,
Methylglucamine,
Diethanolamine,
Sulfoanthranilic acid,
2-(hydroxyethylamino)-5-sulfobenzoic acid,
1 - carboxy- 2 -amido- 3,4 -carboxysulfimidobenzene,
Guanidinacetic acid,
2,4-disulfo-1-naphthylguanidine,
2,3-dimethylindol-5-sulfonic acid,
Piperazinacetic acid,
Methylaminformaldehyde bisulfite, penetrate gelatin layers very easily from neutral or alkaline solutions. Diazo components which do not contain solubilizing groups or do not penetrate for other reasons can be converted into easily penetrating diazoamino compounds by combination with solubilized amines.

Those diazo compounds which contain solubilizing groups such as diazosulfanilic acid may be combined with solubilized or unsolubilized amines such as Piperidine,
Diethylamine,
1-methyl-4-aminobenzene-2-sulfanilide,
Guanylurea,
Hexamethylenetetramine.

Even the combinations of solubilized diazo compounds with unsolubilized amines have better penetrative qualities than the diazonium compounds themselves. The probable reason for this effect is either the affinity of the free diazo group to gelatin, or the fact that the diazoamino compounds may be used in alkaline solution whereas the baths containing the free diazonium salts are acidic.

Other easily penetrating compounds are the diazosulfonates and those nitrosoarylamides which are formed by nitrosation of the monoamides of polyvalent acids or of hydroxycarboxylic acids, such as the nitroso derivatives of glycolic acid anilide or of terephthalic acid monoanisidide.

A further advantage of the inactivated diazo derivatives is of particular importance in the alternative process described in the above mentioned Patent 2,071,688. In this alternative process, the first treatment consists of the local destruction of the diazo compound in the presence of the metallic silver image; the second treatment then consists of the coupling of the remaining diazo compound to form the azo dye.

It was observed that diazonium salts are decomposed in acid solution by metallic silver. Therefore, when a multilayer material containing superimposed metallic silver images is bathed in an acid diazo solution, the diazonium salt does not penetrate homogenously into the material. The diazo solution becomes exhausted by the reaction with the silver in the upper layers, i. e., in those places where an upper layer has a silver image, and less diazo compound penetrates into the lower layers than it does in the places where the upper layers do not contain metallic silver. The interference of upper layer silver images with the formation of lower layer dye images can be excluded by homogeneous incorporation of a diazo compound throughout the layers before said diazo compound is permitted to react with the metallic silver. The homogeneous dispersion is assured whenever the diazo compound is formed in the layers from inert diazo-forming compounds previously incorporated therein. In those cases in which the diazo compound is incorporated from a bath into a multilayer material containing metallic silver images, said bath should be inert with regard to the metallic silver. Antidiazotates, diazosulfonates and diazoamino compounds were found to be particularly useful in this process as they do not react with the metallic silver and can be easily activated following their homogeneous dispersion.

Still another advantage of the diazotates and diazoamino compounds is their stability. For example, in continuous processing the baths must be controlled analytically and kept constant by replenishment. This task is much easier in the case of stable diazotate or diazoamino baths than in the case of a less stable diazotate or diazoamino baths than in the case of a less stable diazonium bath.

Baths containing nitrosoarylamides are preferably weakly acid, whereas the baths containing antidiazotates, diazosulfonates or diazoamino compounds are preferably neutral or weakly alkaline. The best method for the activation of nitrosoarylamides consists in their conversion into syn-diazotates, e. g., under the influence of ammonia vapors, whereas the antidiazotates, diazosulfonates and diazoamines are converted into diazonium salts.

The azo coupling components may be incorporated within the photographic layers, or they may be absorbed from photographic processing baths. If they are absorbed into the layers from a processing bath, they may be absorbed before, simultaneously with, or after the absorption of the diazo forming substance. The diazo-forming substance may be bathed into the photographic layer at any point in the processing.

The preferred diazo derivatives, used in photographic baths according to the present invention are antidiazotates and diazoamino compounds. Antidiazotates are preferred in those cases in which the diazo compound contains electron accepting groups, e. g., the antidiazotates derived from ortho, meta and para-nitraniline, chlornitranilines, nitrotoluidines, dichloranilines, nitroanisidines, nitronaphthalenes and the sulfonic acids, sulfonamides and sulfones derived thereof.

Diazo compounds which are devoid of strongly electron accepting groups, such as diazotized aniline, naphthylamine, anisidine, aminodiphenylether, benzyl - 1-methoxy-2-amino-phenyl-4-sulfone, p-chloro-o-toluidine, 4-chloro-2-aminoanisol, 4-amino-3-methoxyazobenzene, dianisidine, 1-amino-4-benzoylamino - 2,5 - diethoxybenzene, 4,4'-diaminoditolylamine, aminoquinoline, etc. are preferably used as diazoamino compounds.

N-alkyl-, N-aryl- and N-acyl derivatives of p-phenylenediamine, such as N-benzoyl-p-phenylenediamine, 4,4'-diaminodiphenylamine, 4-methoxy-4'-aminodiphenylamine, N-butyl-p-phenylenediamine, etc. can be diazotized and treated with sodium sulfite whereby they are converted into diazosulfonates to be incorporated into photographic baths according to the present invention.

Many diazo compounds such as the three chlorobenzene-diazo compounds can be used with equal success either as antidiazotates or as diazoamino compounds.

The choice of the diazo component depends on the azo coupling components incorporated or to be incorporated in the layer or layers. Having established a diazo component which combines with the coupling components to give dyes of desirable shade and photographic quality, the diazo component is converted into an antidiazotate, diazosulfonate or diazoamino compounds. If it is converted into a diazoamino compound, the amino component is chosen so that the diazoamino compound has the desired solubility and penetrative capacity; that it is stable while it is dissolved in the bath, and that it splits, regenerating the diazo compound, under photographic conditions.

The regenerated diazo compound either is destroyed locally and the remaining diazo compound is coupled to form an azo dye; or the diazo compound is coupled to form a dye and the dye is destroyed locally. The regeneration of the diazo compound (that is: isomerization in the case of diazotates or splitting in the case of the other above defined diazo derivatives), the coupling and the local destruction of the diazo or azo compound may take place in one step or in separate steps.

A photographic material may contain, prior to the incorporation of the diazo derivative, other coloring matter than azo coupling components. For example, a multilayer material may contain an azo dye or a derivative thereof, and furthermore, an azo coupling component. The dye may be destroyed locally in the presence of metallic silver, thereupon the diazo derivative is incorporated and converted into an active diazonium salt, the diazonium salt is destroyed locally in the presence of metallic silver, and the remaining diazonium salt is coupled with the azo coupling component.

A further variation of the present invention consists of the replacement of one diazo derivative with more than one diazo derivatives. For example, a multilayer material containing two non-diffusing azo coupling components, one of which is an amine which couples with a diazo compound at pH 3, the other azo coupling component being an enol that couples at a pH higher than 6, is immersed in a bath containing a diazoamino compound. The diazoamino compound is split in a bath at pH 3 and the free diazo compound is simultaneously coupled with the first of the azo coupling components. The excess of diazo compound is washed out in an acid bath or inactivated by suitable means, e. g., by a cuprous chloride solution. The thoroughly washed material thereupon is treated in a bath containing a second diazo compound, e. g., in an antidiazotate bath and buffered to pH 6, whereby the enolic azo coupling component will couple with the second diazo compound.

The material, to be treated in a bath containing the above defined diazo derivatives, with the exception of diazotates, may contain sensitive silver halide emulsion layers, latent images, metallic silver images or images which are inert to diazonium salts such as silver halogenide images or azo dye images. Materials to be treated in diazotate baths should not contain silver salt images as these tend to fix the diazotate in an uneven form.

Materials which contain the differently sensitized silver halide emulsions in the form of several layers or of small particles on the support are equally suitable to be processed according to the present invention. The diazonium salts, generated by isomerization or splitting of the diazo derivatives, are coupled with azo components which are homogeneously dispersed within each of the emulsion layers or which are dissolved in organic resins suspended within the emulsions.

The azo coupling components can be colorless or colored. For example, they can be monoazo dyes which are capable of forming disazo dyes by coupling with diazo components. These monoazo dyes may be converted into diazo dyes diffusely or they may be destroyed locally prior to the action of the diazo compounds. The reduction products of the monoazo dyes must be removed by a thorough wash or they must be otherwise inactivated in those cases in which a masking effect by coupling the diazo compounds with the reduction products of the azo dyes is not desired. The formation of a monoazo dye image and the successive coupling with a diazo compound is a useful variation of the process whenever the disazo dye is difficult to bleach. For example, many cyan polyazo dyes do not bleach to a pure white in acid dye destruction baths or in alkaline stannite baths, whereas the intermediate dyes which are mostly red or violet, bleach easily under the same conditions. If the intermediate dyes are bleached and the remaining dyes are coupled with diazo compounds, pure cyan dye images can be obtained. Diazotate and diazoamino baths are suitable means to introduce the diazo component in performing this operation.

*Example 1*

A red sensitive emulsion containing the azo coupling component naphthalene-1,5-di-(sulfonaphthionyl-1',5'-aminonaphthol) is coated on a transparent base. On top of this emulsion layer is coated a clear gelatin interlayer and then a high speed green sensitive emulsion containing the n-amyl ether of m-(N,N-diethylamino)-phenol. Thereupon follows a gelatin layer containing a yellow filter dye, and finally the top layer consisting of a blue sensitive emulsion containing N,N'-decamethylene-bis-(2,4-dioxo-1,2,3,4-tetrahydroquinoline).

This material is exposed, developed, fixed and immersed for 3 minutes in a bath containing 0.2% potassium 4-nitro-6-sulfonaphthalene antidiazotate and 0.5% sodium carbonate. The still colorless material is hung for thirty minutes in the air, or for five minutes in a carbon dioxide atmosphere, or shortly rinsed in a diluted acetic acid solution whereby complete coupling takes place. Thereupon it is treated in a dye destruction bath which bleaches the dyes locally at the points where metallic silver is present. Suitable baths are disclosed in U. S. Patent 2,020,775 and subsequent patents such as Re. 22,308 and 2,410,025. After the silver is removed in known manner the material is immersed for a short time in an aqueous solution containing 0.4% ethanolamine and 3% "Polyethylene glycol 300" (Carbide & Carbon Corp.). After drying, a photograph in natural colors is obtained.

The potassium 4-nitro-6-sulfonaphthalene-antidiozotate is prepared by diazotizing 4-nitro-1-naphthylamine-6-sulfonic acid or by nitrating 1-diazo-6-sulfonaphthalene, and by dissolving the isolated diazo compound in potassium hydroxide. After some time crystals begin to appear, and the yield can be increased by addition of potassium chloride to the solution. The aqueous solution of these crystals does not couple with azo couplers; however, it couples with azo couplers under the influence of the carbon dioxide in the air, or in the presence of other weak acids.

If the antidiazotate bath of the above example is replaced by a neutral one, i. e., free from sodium carbonate, it is still stable under exclusion of the air. However, this bath is capable of coupling directly as the presence of the azo coupling components in the layers disturb the equilibrium.

the minute amount of active diazonium compound which is present in this equilibrium, being sufficient to permit a quantitive coupling. The speed of this reaction is influenced by the previous treatment of the photographic material. Gelatin has a remarkable buffering capacity, and the multilayer material therefore maintains characteristic properties caused by pretreatment with acid or alkaline baths even through prolonged washing operations.

*Example 2*

20 ml. of a 3% solution of the dye (2,5-dichlorobenzene)-(1 azo 7)-(8-amino-1-naphthol-3,6-disulfonic acid) and 16 ml. of a 3% solution of anhydrobiguanidobenzylalcohol acetate are added to 150 ml. of a silver bromide gelatin emulsion with due precaution that the precipitated dye does not separate out. The dyed emulsion is sensitized to red light and coated on a transparent cellulose acetate base. On top of this emulsion is coated a green sensitive emulsion which contains 0.7 gr. of N-(naphthalene-2-sulfo)-8-amino-1-naphthol-3,6-disulfonic acid, and an equal amount of anhydrobiguanidobenzylalcohol acetate per 150 ml. of emulsion. Thereon is coated a fogged emulsion containing 0.5 gram of Paper Yellow 3G (Schultz, Farbstofftabellen, 7th Ed., #724) and 0.6 gram of the same precipitating agent as above, and finally an unsensitized emulsion containing for 150 ml. emulsion 0.7 gram of 1,1'-[3,3'-disulfo-diphenylene-(4,4')]-bis-[pyrazolone-(5)-carbonic acid-(3)] and an equal amount of the above mentioned polybiguanide acetate.

This material is exposed and developed in known manner. Thereafter it is immersed in a solution containing the sodium salt of 2,5,2',5'-tetrachlorodiazoaminobenzene-4,4'-disulfonic acid. Then the material is treated for a short time in diluted hydrochloric acid whereby the diazoamine compound splits and the freed diazo compound is destroyed in the place where silver is present. The remaining diazo compound is coupled with the azo components in a sodium acetate bath or in a phosphate buffering bath. The silver is oxidized in a copper chloride bath and the silver salt is removed in a hypo bath.

If the hydrochloric acid both used in the foregoing example contains nitrous acid, only half the quantity of the diazoaminobenzene is needed as the stabilizing component of the diazoamino compound is diazotized by the action of the nitrous acid, whereby the quantity of active diazo compound is doubled.

The presence of nitrous acid in the splitting bath permits the replacement of the hydrochloric acid with a weaker acid, i. e., with acetic acid or with an acetic acid-sodium acetate buffering bath, as the nitrous acid eases the splitting to a remarkable degree; that is, the splitting can be effected at a higher pH in the presence of nitrous acid. At this higher pH, the splitting and coupling takes place in one step, the coupling takes place uniformly and the azo dyes must be destroyed locally in a successive acid bath.

If the material is exposed, developed, fixed and treated in an oxidizing bath such as an acid copper chloride bath to convert the metallic silver image into a silver salt image and thereafter immersed in the diazoamino bath as described above, the diazoamino compound can be split in hydrochloric acid and coupled uniformly in a buffering bath. The dye image formation then takes place by redeveloping the silver image and destroying the azo dyes locally in the above indicated manner.

The sodium salt of 2,5,2',5'-tetrachlorodiazoaminobenzene-4,4'-disulfonic acid is prepared by diazotizing 1 mol. of 2,5-dichloroaniline-4-sulfonic acid with 0.5 mol of sodium nitrite, buffering the solution with sodium acetate and after one hour with an excess of sodium carbonate, precipitating the salt with sodium chloride and washing the salt with alcohol.

This compound can be replaced by the piperidide of the diazotized 2,5-dichloroaniline-4-sulfonic acid or by the combination of this diazo component with any other of the above mentioned amines. The 2,5-dichloro-4-sulfobenzene-antidiazotate is equally suitable.

*Example 3*

A silver halide emulsion, having incorporated therein the dye Pontamine Fast Green 5 BL (Du Pont) and being sensitized with a sensitizer which has its sensitizing maximum at 710 mu, is coated on a support. Thereon is coated a green sensitive emulsion containing N-(naphthalene-2-sulfo)-8-amino-1-napththol-3,6-disulfonic acid and anhydrobiguanidobenzylalcohol acetate, thereon a fogged emulsion containing the dye Paper Yellow 3G and finally an unsensitized emulsion.

The material is exposed, developed, fixed and treated in a dye destruction bath whereby the yellow filter dye is completely bleached and the cyan dye is bleached to form a reverse image. After a thorough wash the material is immersed in an alkaline bath which contains the condensation product of diazotized N-(3-amino-4-methoxybenzyl)-sulfanilic acid with the sodium salt of ethylenediamine-N,N'-diglycolic acid. This compound then is split in a 0.1 $n$ sulfuric acid solution, and simultaneously the splitting product N-(3-diazo-4-methoxybenzyl)-sulfanilic acid is inactivated in the places where metallic silver is present. By immersion in a sodium acetate or in a sodium phosphate buffering bath containing the ammonium salt of acetoacetanilide-sulfonic acid, the diazo compound couples with the naphthalenesulfo-8-amino-1-naphthol-3,6-disulfonic acid to form a reverse magenta image in the middle layer and with the acetoacetanilide to form a reverse yellow image in the top layer. Finally the silver is removed in known manner.

Having described new photographic processing baths and the manner in which they may be used, we claim:

1. In a method of producing a photographic dye image from at least one light sensitive silver salt emulsion layer which comprises exposing and developing the light sensitive material to form a silver containing image, forming the dye image which is reversed with respect to said silver containing image, the image being formed by destroying a dye material of the group consisting of azo dyes and reactive diazo compounds at points in the layer where metallic silver is present, the dye for such image being produced by coupling a reactive diazo compound with a coupling component, and removing the silver image after forming the dye image, the improvement wherein said dye is formed by diffusely incorporating a passive stabilized diazo compound into such layer from a photographic processing bath at a point in the process after exposure of the layer, transforming said passive stabilized diazo compound into a reactive diazo compound within said layer and coupling said reactive diazo compound with an azo coupling component within the layer.

2. In a method of producing a photographic dye image from at least one light sensitive silver salt emulsion layer which comprises exposing and developing the light sensitive material to form a silver containing image, forming the dye image which is reversed with respect to said silver containing image, the image being formed by destroying a dye material of the group consisting of azo dyes and reactive diazo compounds at points in the layer where metallic silver is present, the dye for such image being produced by coupling a reactive diazo compound with a coupling component, and removing the silver image after forming the dye image, the improvement wherein said dye is formed by diffusely incorporating a diazoamino compound into such layer from a photographic processing bath at a point in the process after exposure of the layer, lowering the pH of such layer to transform said diazoamino compound into a reactive diazo compound within said layer and coupling said reactive diazo compound with an azo coupling component within the layer.

3. In a method of producing a photographic dye image from at least one light sensitive silver salt emulsion layer which comprises exposing and developing the light sensitive material to form a silver containing image, forming the dye image which is reversed with respect to said silver containing image, the image being formed by destroying a dye material of the group consisting of azo dyes and reactive diazo compounds at points in the layer where metallic silver is present, the dye for such image being produced by coupling a reactive diazo compound with a coupling component, and removing the silver image after forming the dye image, the improvement wherein said dye is formed by diffusely incorporating a diazoamino compound containing a solubilizing group into such layer from a photographic processing bath at a point in the process after exposure of the layer, lowering the pH of such layer to transform said diazoamino compound into a reactive diazo compound within said layer and coupling said reactive diazo compound with an azo coupling component within the layer.

4. In a method of producing a photographic dye image from at least one light sensitive silver salt emulsion layer which comprises exposing and developing the light sensitive material to form a fixed metallic silver image, forming the dye image which is reversed with respect to said fixed metallic silver image, the image being formed by destroying a dye material of the group consisting of azo dyes and reactive diazo compounds at points in the layer where said metallic silver image is present, the dye for such image being produced by coupling a reactive diazo compound with a coupling component, and removing the silver image after forming the dye image, the improvement wherein said dye is formed by diffusely incorporating an antidiazotate into such layer from a photographic processing bath at a point in the process when such layer contains a fixed metallic silver image, lowering the pH of such layer to transform said antidiazotate into a reactive diazo compound within said layer and coupling said reactive diazo compound with an azo coupling component within the layer.

5. In a method of producing a photographic dye image from at least one light sensitive silver salt emulsion layer which comprises exposing and developing the light sensitive material to form a silver containing image, forming the dye image which is reversed with respect to said silver containing image, the image being formed by destroying a dye material of the group consisting of azo dyes and reactive diazo compounds at points in the layer where metallic silver is present, the dye for such image being produced by coupling a reactive diazo compound with a coupling component, and removing the silver image after forming the dye image, the improvement wherein said dye is formed by diffusely incorporating a diazoamino compound into such layer from a photographic processing bath having a pH of at least 7 at a point in the process after exposure of the layer, lowering the pH of such layer to transform said diazoamino compound into a reactive diazo compound within said layer and coupling said reactive diazo compound with an azo coupling component within the layer.

6. In a method of producing a photographic dye image from at least one light sensitive silver salt emulsion layer which comprises exposing and developing the light sensitive material to form a silver containing image, forming the dye image which is reversed with respect to said silver containing image, the image being formed by destroying a dye material of the group consisting of azo dyes and reactive diazo compounds at points in the layer where metallic silver is present, the dye for such image being produced by coupling a reactive diazo compound with a coupling component, and removing the silver image after forming the dye image, the improvement wherein said dye is formed by diffusely incorporating a diazoamino compound containing a solubilizing group into such layer from a photographic processing bath having a pH of at least 7 at a point in the process after exposure of the layer, lowering the pH of such layer to transform said diazoamino compound into a reactive diazo compound within said layer and coupling said reactive diazo compound with an azo coupling component within the layer.

7. In a method of producing a photographic dye image from at least one light sensitive silver salt emulsion layer which comprises exposing and developing the light sensitive material to form a fixed metallic silver image, forming the dye image which is reversed with respect to said fixed metallic silver image, the image being formed by destroying a dye material of the group consisting of azo dyes and reactive diazo compounds at points in the layer where said metallic silver image is present, the dye for such image being produced by coupling a reactive diazo compound with a coupling component, and removing the silver image after forming the dye image, the improvement wherein said dye is formed by diffusely incorporating an antidiazotate into such layer from a photographic processing bath having a pH of at least 7 at a point in the process when such layer contains a fixed metallic silver image, lowering the pH of such layer to transform said antidiazotate into a reactive diazo compound within said layer and coupling said reactive diazo compound with an azo coupling component within the layer.

8. In a method of producing a photographic dye image from at least one light sensitive silver salt emulsion layer which comprises exposing and developing the light sensitive material to form a fixed metallic silver image, forming the dye image which is reversed with respect to said fixed metallic silver image, the image being formed by destroying a dye material of the group consisting of azo dyes and reactive diazo compounds at points in the layer where said metallic silver image is present, the dye for such image being produced by coupling a reactive diazo compound with a coupling component, and removing the silver image after forming the dye image, the improvement wherein said dye is formed by diffusely incorporating a diazoamino compound into such layer from an alkaline photographic processing bath at a point in the process when such layer contains a fixed metallic silver image, acidifying such layer to transform said diazoamino compound into a reactive diazo compound within said layer and coupling said reactive diazo compound with an azo coupling component within the layer.

9. In a method of producing a photographic dye image from at least one light sensitive silver salt emulsion layer which comprises exposing and developing the light sensitive material to form a fixed metallic silver image, forming the dye image which is reversed with respect to said fixed metallic silver image, the image being formed by destroying a dye material of the group consisting of azo dyes and reactive diazo compounds at points in the layer where said metallic silver image is present, the dye for such image being produced by coupling a reactive diazo compound with a coupling component, and removing the silver image after forming the dye image, the improvement wherein said dye is formed by diffusely incorporating a diazoamino compound containing a solubilizing group into such layer from an alkaline photographic processing bath at a point in the process when such layer contains a fixed metallic silver image, acidifying such layer to transform said diazoamino compound into a reactive diazo compound within said layer and coupling said reactive diazo compound with an azo coupling component within the layer.

10. In a method of producing a photographic dye image from at least one light sensitive silver salt emulsion layer which comprises exposing and developing the light sensitive material to form a fixed metallic silver image, forming the dye image which is reversed with respect to said fixed metallic silver image, the image being formed by destroying a dye material of the group consisting of azo dyes and reactive diazo compounds at points in the layer where said metallic silver image is present, the dye for such image being produced by coupling a reactive diazo compound with a coupling component, and removing the silver image after forming the dye image, the improvement wherein said dye is formed by diffusely incorporating an antidiazotate into such layer from an alkaline photographic bath at a point in the process when such layer contains a fixed metallic silver image, acidifying such layer to transform said antidiazotate into a reactive diazo compound within said layer and coupling said reactive diazo compound with an azo coupling component within the layer.

BÉLA GASPAR.
PAUL DANIEL DREYFUSS.

REFERENCES CITED

The following references are of record in the file of this patent:

UNITED STATES PATENTS

| Number | Name | Date |
|---|---|---|
| 1,963,197 | Froehlich | June 19, 1934 |
| 2,071,688 | Gaspar | Feb. 23, 1937 |
| 2,376,822 | Schneider | May 22, 1945 |

FOREIGN PATENTS

| Number | Country | Date |
|---|---|---|
| 320,603 | Great Britain | Oct. 14, 1929 |

OTHER REFERENCES

Diserens, "Chemical Technology of Dyeing and Printing," Reenhold Publishing Co., June 1947, pp. 316–330, pp. 296–301.

Saunders, "The Aromatic Diazo Compounds and Their Technical Applications," London, E. Arnold Co., 1936, pages 29, 30.

Cain, "The Chemistry of the Diazo Compounds," published 1908, Edward Arnold, London, pp. 139, 141 cited.